(12) United States Patent　　(10) Patent No.: US 8,538,956 B1
Szabadka et al.　　(45) Date of Patent: Sep. 17, 2013

(54) GEOCODING RESULTS USING GEOTOPIC ANNOTATION OF WEB SEARCH RESULTS

(75) Inventors: Zoltan Szabadka, Adliswil (CH); Manjunath Srinivasaiah, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/247,752

(22) Filed: Sep. 28, 2011

(51) Int. Cl.
*G06F 17/00* (2006.01)
(52) U.S. Cl.
USPC ............... 707/724; 707/706; 707/723
(58) Field of Classification Search
USPC .......................... 707/724, 706, 723
See application file for complete search history.

(56) References Cited

U.S. PATENT DOCUMENTS

2010/0257162 A1* 10/2010 Buron et al. ............ 707/723

* cited by examiner

*Primary Examiner* — Belix M Ortiz Ditren
(74) *Attorney, Agent, or Firm* — Fenwick & West LLP

(57) ABSTRACT

Embodiments disclosed herein generally disclose how to provide geocoding results in response to location search queries. A geographical information system receives a search query for a map feature and identifies both web search results and geocoding results that are associated with the search query. The geographical information system determines which geocoding result to return based on the identified web search results.

24 Claims, 3 Drawing Sheets

GEOCODING RESULTS USING GEOTOPIC ANNOTATION OF WEB SEARCH RESULTS

TECHNICAL FIELD

The embodiments disclosed herein generally relate to providing geocoding results. More particularly, the embodiments herein relate to providing geocoding results that have been ranked based on geotopic annotations of web search results associated with a search query.

BACKGROUND

Conventional map systems provide online maps to users in response to queries for the maps. Conventional map systems rely on the completeness of an address included in the search query to provide the appropriate online map to fulfill the query. However, users often provide partial addresses in search queries resulting in incorrect search results. For example, a search query from a user may include a partial address including only a street number and street name in the search query. Because the partial address may correspond to multiple geographic locations, conventional map systems may provide to the user the wrong online map to fulfill the search query.

SUMMARY

The embodiments herein generally describe mechanisms for performing location search queries and providing corresponding geocoding results to fulfill the queries. In one embodiment, a location search query comprises one or more terms that specify a geographical location of interest, such as a street address or a name of the geographical location of interest, for example. The process of identifying geocoding results in response to location search queries is generally referred to as geocoding. In one embodiment, a geocoding result comprises an online map of a geographical location represented by the geocoding result.

Generally, a geographical information system identifies both a set of web search results and a set of geocoding results in response to a location search query. Because the geographical information system allows for ambiguity in the format of the location search query, multiple geocoding results may be identified that match a search query. For example, a location search query may include a partial street address resulting in the identification of multiple geocoding results that match the partial street address. The geographical information system utilizes the web search results to assist in the identification of a geocoding result from the set of geocoding results to provide to a user that submitted the location search query.

In one embodiment, the geographical information system uses geotopics that are annotated to the web search results to identify which of the geocoding results to provide to the user. In one embodiment, a geotopic describes a geographical location that is associated with the web result. Thus, the web search results allow the geographical information system to identify the most likely geocoding result that the user intended to specify in the search query.

For each web result, the geographical information system identifies a set of previously determined geotopics that are associated with the web result if any. The geographical information system also identifies a measure of relatedness between each web result and each of its associated geotopics. The measure of relatedness describes the likelihood that the content of the document represented by the web result is associated with the geographic location represented by the geotopic.

In one embodiment, for each geocoding result, the geographical information system calculates a measure of relatedness between the geocoding result and the location search query. The measure of relatedness between the geocoding result and the location search query describes the likelihood that the geocoding result represents the geographical location of interest that the user intended to search for using the location search query. Additionally, the geographical information system may calculate a measure of similarity between each geocoding result and each geotopic included in the set of web search results. The measure of similarity between each geocoding result and each geotopic describes the similarity of the geographical location associated with the geocoding result and the geographic location represented by the geotopic. That is, the measure of similarity describes whether the geographical location corresponding to the geocoding result matches the geographical location corresponding to the geotopic.

In one embodiment, the geographical information system may also calculate a weight for the measure of relatedness between the geocoding result and the location search query. The weight describes how many web search results are associated with each geocoding result. The weight may be based on the measure of relatedness between each web result and each of its associated geotopics and the measure of similarity between each geocoding result and each geotopic.

The geographical information system ranks (or re-ranks) the set of geocoding results based on the weighted measures of relatedness between each geocoding result and the search query. The geographical information system provides an online map of a geocoding result from the ranked set of geocoding results. In one embodiment, an online map of the highest ranked geocoding result is provided to the client that submitted the request.

The features and advantages described in this summary and the following detailed description are not intended to be limiting. Many additional features and advantages will be apparent to one of ordinary skill in the art in view of the drawings, specification and claims.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
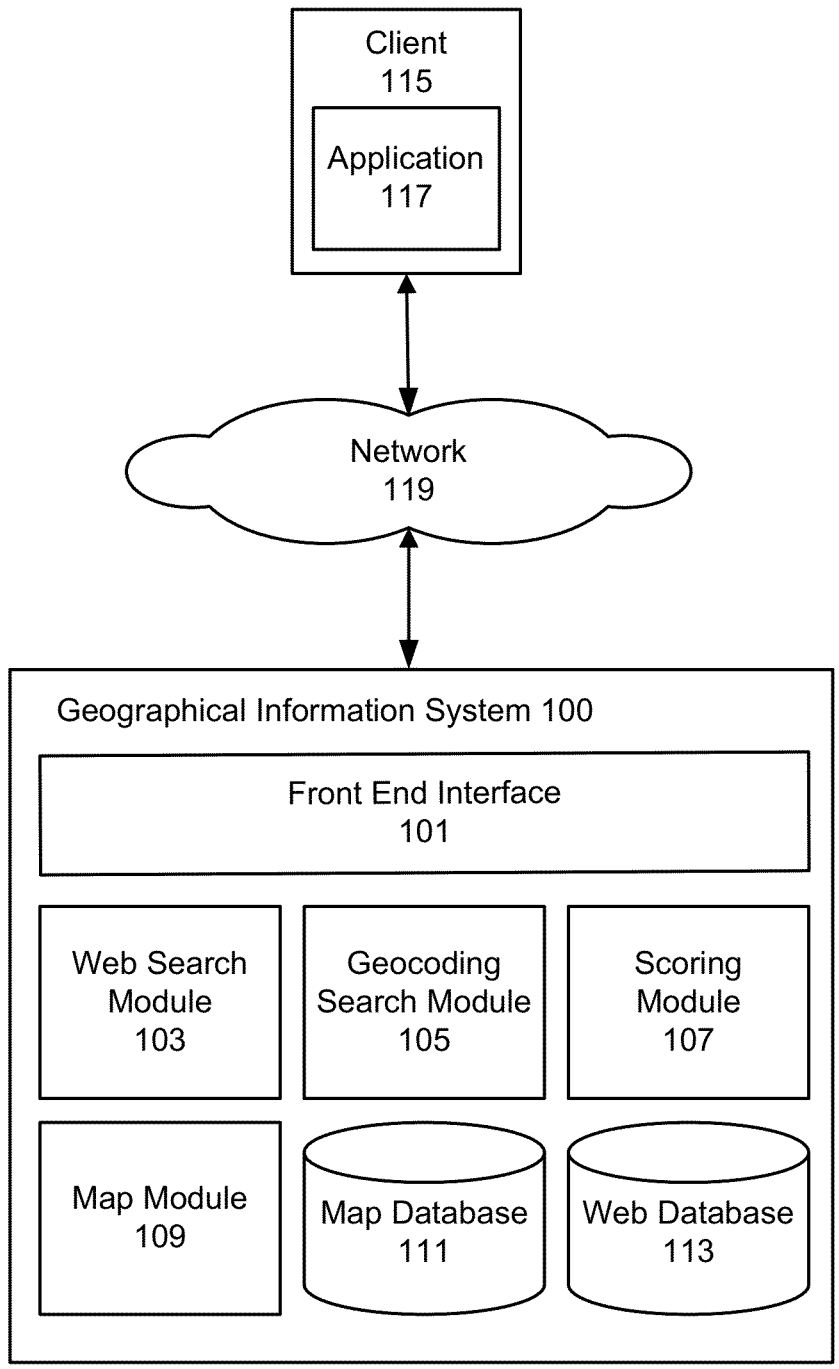
FIG. 1 illustrates a system architecture of a geographical information system according to one embodiment.

FIG. 1 illustrates a system architecture of a geographical information system 100 that provides geocoding results to fulfill location search queries for map features. In one embodiment, a geocoding result comprises an online map that is associated with a map feature specified in a location search query otherwise referred herein as a "search query." Generally, a map feature may signify any entity that can be represented on an online map such as geographical locations associated with street addresses, points of interests, buildings, countries, provinces, islands, states, bodies of water, cities, natural features (e.g., mountain ranges), etc.

In one embodiment, a location search query includes an address associated with a map feature. The address may be a partial address because the address does not include all the possible address components of a complete address. For example, a complete address may include values for the following address components such as a street number, street name, neighborhood, district, zip code, city, state, province, and country. Thus, a partial address includes some but not all of the address components above. For example, the search query may merely include a street number and street name. In another example, the search query may include a name of a point of interest such as "Union Square" which is ambiguous because there are multiple geographic locations which are associated with the name "Union Square."

Because the geographical information system 100 may identify multiple geocoding results in response to a location search query with a partial address, the geographical information system 100 determines which of the geocoding results to provide to the user that submitted the query. In one embodiment, the geographical information system 100 identifies web search results associated with the search query, and uses those web search results to infer a geographical location that the user most likely intended to search for in the query. The geographical information system 100 provides a geocoding result associated with the inferred geographical location to the user to fulfill the query.

As shown in the embodiment of FIG. 1, the geographical information system 100 includes a front end interface 101, a web search module 103, a geocoding search module 105, a scoring module 107, a map module 109, a map database 111, and a web database 113. Each of these modules and databases is described in further detail below. Many conventional features, such as firewalls, load balancers, application servers, failover servers, site management tools and so forth are not shown so as not to obscure the features of the system.

In one embodiment, a suitable website for implementation of the geographical information system 100 is the GOOGLE™ Maps website, found at maps.google.com. Other map sites are known as well, and can be adapted to operate according to the teaching disclosed herein. The term "website" represents any computer system adapted to serve content using any networking protocol, and is not intended to be limited to content uploaded or downloaded via the Internet or the HTTP protocol. In general, functions described in one embodiment as being performed on the server side can also be performed on the client side in other embodiments. In addition, the functionality attributed to a particular component can be performed by different or multiple components operating together. Likewise, the functionality attributed to different or multiple components can be combined to be performed by fewer or even a single component.

In one embodiment, the geographical information system 100 is implemented as server program executing on server-class computer comprising a CPU, memory, network interface, peripheral interfaces, and other well known components. In one embodiment, the computers themselves run an operating system such as LINUX, Microsoft Windows, or Mac OS X, have generally high performance CPUs, 2G or more of memory, and 1 TB or more of disk storage. Of course, other types of computers can be used, and it is expected that as more powerful computers are developed in the future, they can be configured in accordance with the teachings here. The functionality implemented by any of the elements can be provided by computer program products (e.g., as computer executable instructions) that are stored in non-transitory computer-readable storage mediums (e.g., RAM, hard disk, or optical/magnetic media). It will be appreciated that the data processing methods and processes described and claimed herein require the use of a computer, and cannot be performed as purely mental steps.

In one embodiment, and as shown in FIG. 1, a client 115 executing an application 117 connects to the geographical information system 100 to allow a user to view online maps provided by the geographical information system 100. The client 115 may connect to the geographical information system 100 via a network 119 such as the Internet or any combination of a LAN, a MAN, a WAN, a mobile, wired or wireless network, a private network, or a virtual private network. While only a single client 115 is shown in FIG. 1, in general very large numbers (e.g., millions) of clients 115 are supported and can be in communication with the geographical information system 100 at any time. In one embodiment, the client 115 can be implemented using any of a variety of different computing devices, some examples of which are personal computers, digital assistants, personal digital assistants, cellular phones, mobile phones, smart phones and laptop computers.

The application 117 is any application that allows users of clients 115 to access content, such as web pages, via the Internet. Suitable applications 117 include, but are not limited to web browsers such GOOGLE CHROME, MICROSOFT INTERNET EXPLORER, NETSCAPE NAVIGATOR, MOZILLA FIREFOX, and APPLE SAFARI. The application 117 may also be a dedicated application that provides online maps, such as map reader, navigation application, check-in application, recommendations application, or the like. The application 117 allows the user of client 115 to access websites comprising online maps provided by the geographical information system 100 via a user interface provided by the front end interface 101. Through the interface 101, a user can view online maps provided by the geographical information system 100.

Geographical Information System

As shown in FIG. 1, the geographical information system 100 comprises a map database 111. The map database 111 stores map information associated with map features that are displayed on digital or online maps, and is one means for performing this function. The map information defines parameters used to render map features for online maps as well as information associated with the map features. In one embodiment, a map feature represents a real world object that can be represented on an online map such as geographical locations associated with street addresses, cities, neighborhoods, buildings, points of interests, countries, provinces, islands, states, bodies of water, natural features (e.g., mountain ranges), etc. Each map feature is assigned a unique identification (ID) in the map database 111 to distinguish the map features from one another. In one embodiment, a map feature is associated with an address that represents the geographical location of the map feature, geospatial identifiers (e.g., latitude and longitude coordinates) associated with the map feature, and/or a name of the map feature. For some map features, the address may also function as the name for the map feature.

The map module 109 is any web-based application known in the art that provides online or digital maps and information about map features to users. Exemplary web-based applications include GOOGLE Maps and GOOGLE Earth. The map module 109 utilizes the map information in the map database 111 to generate two-dimensional and/or three-dimensional digital maps and populate the maps with map features. The map module 109 may construct an online map on the fly based on map tiles (e.g., images) corresponding to the map information in the map database 111 and transmit the online map to the client 115. Alternatively, rather than constructing the online map at the geographical information system 100, the map module 109 may transmit a map image and map information associated with the search query to the client 115 which constructs the online map on the fly (i.e., real time) for the user that provided the query.

The geographical information system 100 also comprises a web database 113. The web database 113 includes an index of documents. In the context of this description, "documents" are understood to be any type of media that can be indexed and retrieved by the geographical information system 100 or an affiliated web search engine or web crawling system, including web documents, images, multimedia files, text documents, PDFs or other image formatted files, and so forth. A document may have one or more pages, partitions, segments or other components, as appropriate to its content and type. Equivalently a document may be referred to as a "page," as commonly used to refer to documents on the Internet. No limitation as to the scope of the description is implied by the use of the generic term "documents." Each document has an associated identifier that uniquely identifies the document; the identifier is preferably a uniform resource locator (URL), but other types of identifiers (e.g., document numbers) may be used as well. In this disclosure, the use of URLs to identify documents is assumed.

One or more documents in the web database 113 can be associated with metadata that describes the content of the document. In one embodiment, metadata for a document comprises a set of geotopics $g_k$ that are associated with the document and geospatial identifiers (e.g., latitude and longitude coordinates) that are associated with each geotopic $g_k$, where k references a particular geotopic. A geotopic $g_k$ describes a geographic location that is associated with the document. Each geotopic $g_k$ may be assigned a unique ID that distinguishes the geotopic $g_k$ from other geotopics. Thus, the web database 113 maintains a list of geotopics (i.e., geographic locations) and their associated ID, and a list of annotated documents that are associated with one or more geotopics. In one embodiment, the unique IDs included in the list of geotopics correspond to the unique IDs of the map features in the map database 111. Thus, each geotopic corresponds to a map feature.

The geographical information system 100 identifies particular geotopics $g_k$ in a document based on the list of geotopics. Generally, the geographical information system 100 identifies any text in a document that matches a geotopic in the list of geotopics using the geocoding search module 105. Specifically, a geotopic $g_k$ for a document may be identified from the content of the document itself such as in the title of the document, in the text body of the document, or from audiovisual content included in the document. For example, a document describing a review of a restaurant in San Francisco, Calif. may be associated with a set of geotopics. The set of geotopics may include the geotopics "San Francisco," "California," and "San Francisco, Calif." based on the address of the restaurant as described in the document. Additionally, the set of geotopics for the document may include the geotopics "Chicago," "Illinois," and "Chicago, Ill." because the document compares the restaurant located in San Francisco to another restaurant located in Chicago.

In one embodiment, each geotopic $g_k$ associated with a document is assigned a geotopic score $gs_k$. The geotopic score $gs_k$ is a measure of relatedness between the geotopic $g_k$ and the document. That is, the geotopic score $gs_k$ describes the likelihood that the content of the document pertains to the geographic location represented by the geotopic $g_k$.

In one embodiment, a geotopic score $g_{sk}$ for a geotopic $g_k$ is assigned a higher value if it appears in particular locations or areas of the document. That is, different areas (e.g., title, main text, and tags) may be associated with different weights to determine the geotopic score $g_{sk}$ for a geotopic $g_k$. For example, if the geotopic $g_k$ appears in the title of the document, the geotopic score $g_{sk}$ may be assigned a higher value than another geotopic $g_k$ that appeared at the end of the document or in a footnote of the document.

In one embodiment, the geotopic score $g_{sk}$ for a geotopic $g_k$ that appears in the title of the document may be inversely proportional to the quantity (i.e., number) of other geographic locations that are referenced by other geotopics that are also included in the title. If a single geotopic $g_k$ is referenced in the title of the document, the geotopic score $g_{sk}$ may be higher than the geotopic scores $g_{sk}$ for multiple geotopics that appear in a title of another document.

In one embodiment, a geotopic $g_k$ that appears near the start or beginning of a document (e.g., within a threshold quantity of words of the document or within a threshold quantity of pixels at the top of the document) are considered "leading geotopics." A leading geotopic may provide a reliable indication of the geographic location to which the document is relevant. Thus, a geotopic $g_k$ that is a leading geotopic may be assigned a higher weight than geotopics that appear later in the document (e.g., outside of the threshold quantity of words or outside of the threshold quantity of pixels).

For example, a geotopic $g_k$ that is in the first sentence of the first paragraph of a document may be assigned a higher geotopic score $g_{sk}$ than a geotopic $g_k$ that is included in the second paragraph of the document. In another example, a document representing a news article may include a byline location comprising a geotopic $g_k$ that represents where the news article was filed and/or written. This geotopic $g_k$ may be assigned a higher geotopic score $g_{sk}$ than geotopics that appear later in the news article because the location listed in the byline is often the geographic location where events reported in the news article occurred. Therefore, the geotopic $g_k$ included in the byline may be a reliable indication of a geographic location to which the news article is relevant.

Some documents may include tags, which are presented to the user or stored in metadata for the documents. These tags are used by an author of the document to facilitate indexing and discovery of the document. Therefore, geotopics that are included in the tags of the document can be a reliable indicator of geographic locations to which the document is relevant. Thus, a geotopic $g_k$ that appears in a tag may be assigned a higher weight than another geotopic $g_k$ that appears in the body of the document.

In another embodiment, geotopics may be assigned to a class of geotopics referred to as "qualified geotopics" which describe the relatedness of geotopics in the document. A qualified geotopic is a geotopic $g_k$ that is created as a result of the merger of two individual geotopics. For example, a geotopic "Cleveland" and a geotopic "Ohio" may be combined to create the qualified geotopic "Cleveland, Ohio." Qualified geotopics generally include individual geotopics that are located adjacent to each other and/or appear in a specific sequence. Qualified geotopics can also be created from geotopics that are not adjacent to each other or in a specified sequence but are semantically related to one another. For example, if the "Springfield" geotopic and "Ohio" geotopic both appear in the document and no other states containing Springfield (e.g., Missouri or Illinois) appear on the document, the geotopics "Springfield" and "Ohio" can be combined to make the terms less ambiguous. In one embodiment, qualified geotopics are assigned a higher geotopic score $gs_k$ than non-qualified (unqualified) geotopics.

In one embodiment, a parental support for a geographical location is used to increase the geotopic scores of geotopics associated with the geographical location. The parental support may describe a measure of the geotopics that are in child categories of a parent category. For example, a document comprising two geotopics that identify Erie, Pa., but Erie has a parental support of 80% for Pennsylvania (i.e., four of five geotopics are assigned to or resolve to Pennsylvania) and 100% parental support for USA (all five geotopics resolve to USA) for an average parental support of 90% for the geotopics.

In one embodiment, the geotopic score $gs_k$ for a geotopic $g_k$ is based on a plurality of weights and an initial geotopic score $igs_k$. The factors and weights used to calculate the initial geotopic score $igs_k$ comprise one or more of the following:

The title score TS that is provided for a geotopic $g_k$ that is included in the title of the document (e.g., 1.0 if a geotopic $g_k$ is included in the title and 0 if the geotopic $g_k$ is not included in the title);

The title boost weight TBW assigned to a geotopic $g_k$ if it is the only geotopic in the title of the document;

A quantity Q of geotopics that are classified as leading geotopics in the document;

A leading geotopic weight LGW for a geotopic $g_k$ in the document that is classified as a leading geotopic;

A qualified geotopic weight QGW for a geotopic $g_k$ that is classified as a qualified geotopic;

A tag weight TG for a geotopic $g_k$ located in tags of a document;

A total quantity TC of geotopics that reference a particular geographical location associated with the geotopic $g_k$; and A geotopic parental support weight GPSW for a geotopic parental support.

The relationship of the weights and factors to each other in an exemplary embodiment is represented by the following equation:

$$igs_k = [1+\max(TS \cdot TBW, Q \cdot LGW)] \cdot (1+QGW+TG) + (TC \cdot GPSW)$$

In one embodiment, the following weights may be used to calculate the initial geotopic score $igs_k$ for a geotopic $g_k$ as shown below.

TABLE 2

Example Weights

| Weight | Value |
|---|---|
| Title boost weight TBW | 1.2 |
| Leading geotopic weight LGW | 1.1 |
| Qualified geotopic weight QGW | 1.1 |
| Tag weight TG | 1.05 |
| Geotopic parental support weight GPSW | 1.05 |

In one embodiment, the weights may be determined, for example, based on a statistical analysis of search logs (i.e., logs that specify search results that were selected by users that submitted search queries) to estimate likelihoods that documents including particular geotopics are relevant to the geographical locations associated with the geotopics. The likelihoods can be used to select weights based on (e.g., proportional to) to the likelihoods.

In one embodiment, the geotopic score $gs_k$ for a geotopic $g_k$ is calculated based on the initial geotopic score $igs_k$ for the geotopic $g_k$ and the initial geotopic score $igs_j$ for other geotopics $g_j$ that are included in the document from which geotopic $g_k$ is identified. The relationship of these factors to each other in an exemplary embodiment is represented by the following equation:

$$gs_k = \frac{igs_k}{\text{sum}(igs_j)}$$

Thus, the geotopic score $gs_k$ for each geotopic $g_k$ is computed by normalizing the initial geotopic score $igs_k$ for the geotopic $g_k$ using the sum of the initial geotopic scores $igs_j$ of geotopics $gs_k$ that are also included in the document from which geotopic score $gs_k$ is identified.

Table 1 below, illustrates one example of three document entries in the web database 113 and how these documents would be coded to represent the associated geotopics $g_k$. Although only three documents are illustrated, it is understood that the web database 113 may store entries for any number of documents. Each row of the table indicates a record for a document entry. Each record includes a document identification (ID) associated with the record, a URL that links to the document, a collection of geotopics (if any) that are associated with the document, a geospatial identifier associated with each geotopic, and a geotopic score $gs_k$ associated with each geotopic $g_k$. As shown below, documents 1 and 2 are associated with a set of geotopics whereas document 3 is not associated with a set of geotopics.

TABLE 1

Example Entries of the Web Database 113

| Id | URL | Geotopics ($g_k$) | Location | Geotopic Scores |
|---|---|---|---|---|
| 1 | www.exampleURL1.com | $g_1$ = San Francisco, CA<br>$g_2$ = Chicago, IL<br>$g_3$ = New York, NY | $g_1$ = 37° 47' N/122° 26' W<br>$g_2$ = 41° 51' N/87° 39' W<br>$g_3$ = 40° 4' N/74° 0' W | $gs_1$ = 0.5<br>$gs_2$ = 0.25<br>$gs_3$ = 0.25 |
| 2 | www.exampleURL2.com | $g_4$ = Los Angeles, CA<br>$g_2$ = Chicago, IL | $g_4$ = 34° 3' N/118° 14' W<br>$g_2$ = 41° 51' N/87° 39' W | $gs_4$ = 0.5<br>$gs_2$ = 0.5 |
| 3 | www.exampleURL3.com | N/A | N/A | N/A |

As shown in FIG. 1, the geographical information system 100 further comprises a web search module 103. The web search module 103 receives a location search query from the client 115. As previously mentioned, the address included in the location search query may be incomplete. For example, the query may merely include the keywords representing a name of a map feature such as "Union Square," but fails to further include other terms that provide an indication of the location of the map feature. The web search module 103 searches the web database 113 to identify documents that are relevant to the search query for inclusion in web search results. The web search module 103 identifies keywords in the search query, and then identifies documents that match the keywords. In one embodiment, the web search module 103 identifies documents for the web search results based on a match between metadata (e.g., geotopics) associated with the documents and keywords in the search query. The web search module 103 may also identify documents for the web search results based on a match between a title of the document and the search query. The web search module 103 may rank the documents in the search results using the presence of keywords from the query in the documents to influence the ranking order.

As described above, documents included in the web search results may have associated geotopics and geotopic scores. In one embodiment, the web search module 103 normalizes the geotopic scores $gs_k$ of geotopics $g_k$ that are associated with the documents in the web search results. The web search module 103 may normalize the geotopic scores $gs_k$ based on the total number of documents included in the web search results. For example, the search query for "Union Square" may result in the identification of five web search results, including documents 1 and 2 shown above in Table 1. The geotopic scores $gs_k$ for document 1 would then be normalized based on a factor of five (i.e., the total number of web search results) resulting in normalized geotopic scores of:

$$\overline{gs}_1=(0.5/5)=0.1$$

$$\overline{gs}_2=(0.25+0.5)/5=0.15$$

$$\overline{gs}_3=(0.25/5)=0.05$$

$$\overline{gs}_4=(0.5/5)=0.1$$

In one embodiment, the geocoding search module 105 identifies geocoding results $G_m$ associated with the location search query received by the web search module 103. The geocoding search module 105 identifies one or more keywords in the search query, and searches the map database 111 for one or more geographical locations (i.e., map features) that match the one or more keywords identified in the location search query. The matching geographical locations represent the geocoding results for the search query.

In one embodiment, the geocoding results $G_m$ are initially ordered or ranked based on the similarity of the keywords from the query to the names of the geographical locations included in the geocoding results. Alternatively, the ranking may be influenced based on the geographic location of the client 115 that submitted the search query, which may be identified based on the internet protocol (IP) address associated with the client 115 or based on global positioning signals received by the client 115. Geocoding results $G_m$ that are closer in terms of distance to the geographic location of the client 115 may be ranked higher than geocoding results that are farther from the location of the client 115.

Figure 2A:
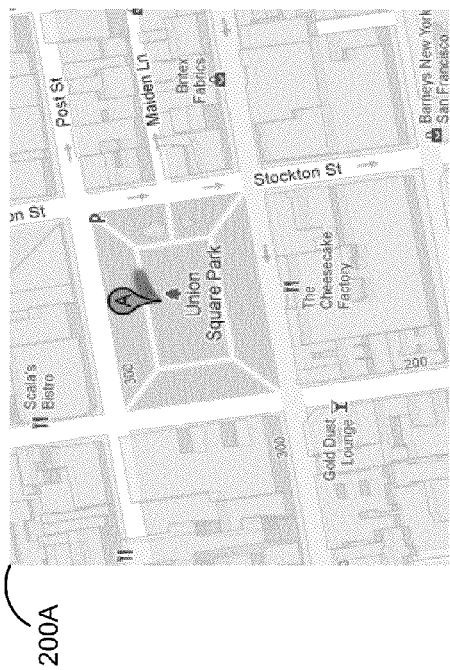
FIGS. 2A-2C illustrate representations of candidate online maps according to one embodiment.
Figure 2B:
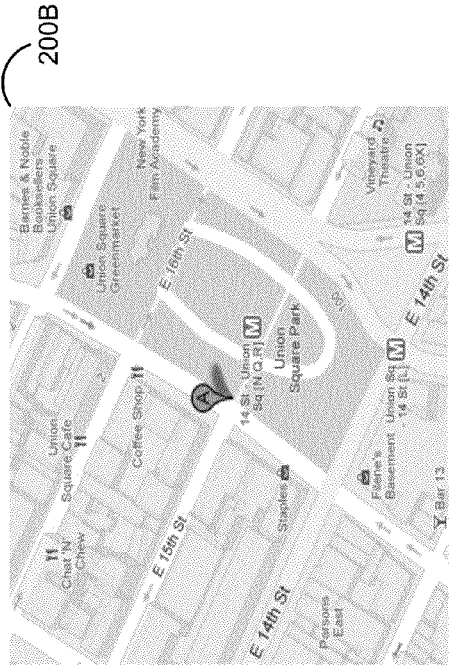
Figure 2C:
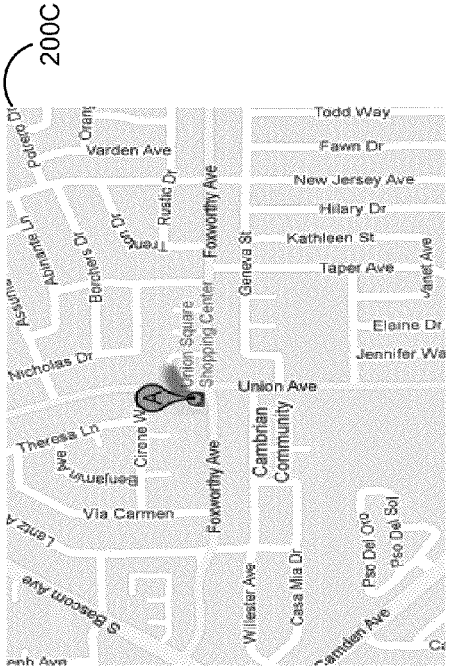

In one example, the geocoding search module 105 may receive a location search query including the keywords "Union Square." In this example, the query terms do not specify the specific "Union Square" of interest. Accordingly, the geocoding search module 105 may identify multiple geocoding results $G_m$ that match the query for "Union Square." For example, the geocoding results may include the geographic locations of "Union Square Park" in San Francisco, Calif., "Union Square Park" in New York, N.Y., and "Union Square Shopping Center" in San Jose, Calif. FIGS. 2A, 2B, and 2C respectively illustrate online maps 200A, 200B, and 200C, for the geocoding results associated with "Union Square Park" in San Francisco, Calif., "Union Square Park" in New York, N.Y., and "Union Square Shopping Center" in San Jose, Calif. As will be further described below, the geographical information system 100 determines which of the online maps 200 to provide to the client 115 to fulfill the query for "Union Square."

In one embodiment, the scoring module 107 in the geographical information system 100 ranks (or re-ranks) the geocoding results $G_m$ based at least in part on the web search results associated with the location search query and the search query itself. For each geocoding result $G_m$, the scoring module 107 calculates a geocoding score $S_m$ that describes a measure of relatedness between the geocoding result $G_m$ and the search query. That is, a geocoding score $G_m$, for a geocoding result $G_m$ represents the likelihood that the geocoding result $G_m$ represents a geographical location of interest that the user intended to search for in the location search query. In one embodiment, the geocoding score $S_m$ for a geocoding result $G_m$ is based at least in part on one or more of the following criteria:

a similarity criteria $SC_i$ describing the similarity of the geocoding result $G_m$ and the keywords of the search query, where "i" corresponds to a keyword in the search query;

a query criteria Q describing the completeness of the query terms included in the location search query; and a prominence criteria P describing the prominence of the geographic location associated with the geocoding result $G_m$.

As previously mentioned, a geographic location represented by a geocoding result $G_m$ may be associated with a name that includes one or more keywords such as "Union Square Park, New York City, N.Y." In one embodiment, the similarity of the geocoding result $G_m$ and the keywords obtained from the search query is based on the number of terms in the name of the geographic location that match the keywords obtained from the search query. The value of the similarity criteria $SC_i$ for a particular term i in the location search query may include a product of weights. The weights may include a token mass and a relevance score for the term i in the search query. The token mass may reflect the nature or type of term in the search query. Examples of term types include stop words, street affix words (e.g., a street prefix word such as "rue" in French or street suffix words such as "street," "road," and "place" in English), numbers, synonyms, etc., with each predefined type being assigned a particular token mass. In one embodiment, the token mass may range in value between 0 to 1.

In one embodiment, the relevance score may reflect the degree of text match between the query term i and the name of the geographic location corresponding to the geocoding result $G_m$. For example, a complete text match between a query term i and a term in the name of the geographic location may be associated with a value of 1, whereas only a partial match between the query term i and a term in the name of the geographic location may be associated with a value that is less than 1 and that reflects the degree of the text match. In one embodiment, the value of $SC_i$ for a particular term i may be the product of the token mass value and relevance score for the term i.

As mentioned previously, a location search query may include values corresponding to various address components, such as a street number, street name, neighborhood, district, zip code, city, state, province, and country. The query criteria Q describe how many of those address components were provided in the location search query received from the client 115. Thus, if the location search query includes all of the address components mentioned above, the query is considered to be complete and thus the query criteria Q has a value of 1 in one embodiment. If the search query lacks some of the address components, the search query is considered incomplete and thus the query criteria Q has a value that is less than 1 and that decreases as the number of missing address components increases.

The prominence criteria P describe the prominence of the geographic location associated with the geocoding result $G_m$. In one embodiment, the prominence of the geographic location is based on the population of the geographic location. Thus, a geographic location comprising a region of higher population is more prominent than a geographic location comprising a region of lower population and would accordingly have a higher prominence score P and geocoding score $S_m$.

The relationship between the geocoding score $S_m$ and each of these criteria in an exemplary embodiment is represented by the following equation:

$$S_m = \frac{1}{E}\left[\sum_i SC_i\right] \cdot Q \cdot P$$

While the scoring module 107 calculates the geocoding score $S_m$ for each geocoding result $G_m$ based on the above equation in one embodiment, other embodiments using other geocoding scoring functions can also be used. In such embodiments, the geocoding scoring function can use some or all of the criteria mentioned above, as well as additional criteria. In one embodiment, the variable "E" is a normalization value that corresponds to the maximum value of the sum of the $SC_i$ scores for a perfect match or equivalently the sum of the token masses for the keywords in the search query.

For each geocoding result $G_m$, the scoring module 107 also calculates a similarity score S(m,k) that describes a measure of relatedness between the geocoding result $G_m$ and each geotopic $g_k$ included in the web search results. The similarity score S(m,k) describes the similarity of the geographical location associated with the geocoding result $G_m$ and the geographic location represented by the geotopic $g_k$. A similarity score S(m,k) between a geocoding result $G_m$ and a geotopic $g_k$ can be based at least in part on one or more of the following factors:
- a matching criteria describing whether the geographic location of the geocoding result $G_m$ matches the geographic location associated with the geotopic $g_k$;
- a distance criteria describing whether the geographic location associated with the geocoding result $G_m$ is within a threshold distance (e.g., 10 kilometers) from the geographic location represented by the geotopic $g_k$; and
- a partial matching criteria describing whether the name of the geographic location associated with the geotopic $g_k$ is included in an address of the geographic location associated with the geocoding result $G_m$ (e.g., the geotopic is New York, N.Y. and the geocoding result is 111 $8^{th}$ Ave. New York, N.Y.).

In one embodiment, the similarity score S(m,k) between a geocoding result $G_m$ and a geotopic $g_k$ is based on constant parameter values. For example, if the matching criteria indicates that an ID of the geocoding result $G_m$ and the ID of the geotopic $g_k$ match, the scoring module 107 adds a constant value (e.g., 3.0) to the similarity score S(m,k). Similarly, if the distance criteria indicates that the geographic location associated with the geocoding result $G_m$ is within a threshold distance (e.g., 10 kilometers) from the geographic location represented by the geotopic $g_k$, the scoring module adds a constant value to the similarity score S(m,k). In one embodiment, the constant value for the distance criteria as well as for the partial matching criteria is based on the type of map feature represented by the geotopic $g_k$.

Generally, a map feature that describes a more specific geographic location is associated with a higher constant value than a map feature that describes a general geographic location. For example, a map feature associated with a street address may be assigned a higher constant value than a map feature associated with a state. Below is one embodiment of the constant values assigned to the similarity score S(m,k) based on geotopic type:
- streets or neighborhoods: 1.0
- districts within a city: 0.9
- cities and villages: 0.8
- county and zip code: 0.6
- province and country: 0.0

For example, if the geotopic $g_k$ comprises a street or neighborhood that is included in the geocoding result $G_m$, or if the street or neighborhood is within the threshold distance of the geographic location associated with the geocoding result $G_m$, the scoring module 107 assigns a value of 1.0 to the similarity score S(m,k). However, if the geotopic $g_k$ comprises a district (e.g., Manhattan or the Bronx) that is included in the geocoding result $G_m$ or if the district is within the threshold distance of the geographic location associated with the geocoding result $G_m$, the scoring module 107 assigns a value of 0.9 to the similarity score S(m,k). If the geotopic $g_k$ comprises a city or village that is included in the geocoding result $G_m$ or if the city or village is within the threshold distance of the geographic location associated with the geocoding result $G_m$, the scoring module 107 assigns a value of 0.8 to the similarity score S(m,k). Additionally, the scoring module 107 assigns a value of 0.6 if the geotopic $g_k$ comprises a country or zip code that is included in the geocoding result $G_m$, or if the country or zip code is within the threshold distance of the geographic location associated with the geocoding result $G_m$. In one embodiment, no value is assigned to the similarity score S(m,k) if the geotopic $g_k$ comprises a province or country that is included in the geocoding result $G_m$ because provinces and countries are too general of a location to assist in the determination of which geocoding result to provide to the client 115. Note that in other embodiments, different constant values may be assigned to the various geotopic types shown above.

In one embodiment, the scoring module 107 calculates a web support score $W_m$ for each geocode result $G_m$ that describes how many web search results are associated with the geocode result $G_m$. The web support score $W_m$ for each geocode result $G_m$ is based at least in part on the similarity score S(m,k) between a geocode result $G_m$ and a geotopic $g_k$ and the normalized geotopic score $\overline{gs}_k$ for each geotopic $g_k$.

The relationship of these factors to each other in an exemplary embodiment is represented by the following equation:

$$W_m = \max\{\overline{gs}_k \cdot S(m,k)\} \text{ where } k=1\ldots n$$

In the above equation, the scoring module 107 multiplies the similarity score S(m,k) for a geocoding result $G_m$ and a geotopic's normalized geotopic score $\overline{gs}_k$, and determines a particular geotopic $g_k$ (i.e., a particular value for k) that maximizes the product. The scoring module 107 then assigns the product having the maximum value as the web support score $W_m$ for the geocoding result $G_m$.

In one embodiment, the scoring module 107 adds the web support score $W_m$ to the geocoding score $S_m$ for a geocoding result $G_m$ to create an updated geocoding score $US_m$ for the geocoding result $G_m$. The scoring module 107 may re-rank the geocoding results based on the updated geocoding score $US_m$. Alternatively, the scoring module 107 may only add the web support score $W_m$ to the geocoding score $S_m$ for the geocoding result $G_m$ if the web support score $W_m$ is above a threshold value. Based on the re-ranked geocoding results, the scoring module 107 identifies which geocoding result $G_m$ to provide to the client 115 to fulfill the search query.

Consider the example where the geographical information system 100 identifies the following three geocoding results $G_m$ and determines respective geocoding scores $S_m$ in response to a search query as:

$$G_1(S_1) = G_1(0.3);$$

$$G_2(S_2) = G_2(0.25); \text{ and}$$

$$G_3(S_3) = G_3(0.2).$$

Assume that geocoding results G1, G2, and G3 respectively correspond to the online maps 200A, 200B, and 200C illustrated in FIGS. 2A through 2C. Furthermore, assume that the geographical information system 100 identifies the following web search results $R_n$ and their associated geotopics $g_k$:

$$R_1: g_1(gs_1), g_2(gs_2), g3(gs_3) = g_1(0.5), g_2(0.25), g3(0.25);$$

$$R_2: g_2(gs_2), g_4(gs_4) = g_2(0.5), g_4(0.5);$$

$$R_3;$$

$$R_4; \text{ and}$$

$$R_5.$$

As shown above, only web search results $R_1$ and $R_2$ have associated geotopics. The geotopics $g_k$ and their associated normalized geotopic scores $\overline{gs}_k$ are as follows:

$$\overline{gs}_1 = 0.1;$$

$$\overline{gs}_2 = 0.15;$$

$$\overline{gs}_3 = 0.05; \text{ and}$$

$$\overline{gs}_4 = 0.1;$$

Furthermore, assume the following similarity scores S(m, k) between each geocoding result $G_m$ and each geotopic $g_k$:
S(1,1) for geocoding result $G_1$ and geotopic $g_1 = 0$;
S(1,2) for geocoding result $G_1$ and geotopic $g_2 = 0$;
S(1,3) for geocoding result $G_1$ and geotopic $g_3 = 0$;
S(1,4) for geocoding result $G_1$ and geotopic $g_4 = 0$;
S(2,1) for geocoding result $G_2$ and geotopic $g_1 = 0.8$;
S(2,2) for geocoding result $G_2$ and geotopic $g_2 = 0$;
S(2,3) for geocoding result $G_2$ and geotopic $g_3 = 0$;
S(2,4) for geocoding result $G_2$ and geotopic $g_4 = 0$;
S(3,1) for geocoding result $G_3$ and geotopic $g_1 = 0$;
S(3,2) for geocoding result $G_3$ and geotopic $g_2 = 0$;
S(3,3) for geocoding result $G_3$ and geotopic $g_3 = 0$; and
S(3,4) for geocoding result $G_3$ and geotopic $g_4 = 0$;

According to the equation that represents the web support score $W_m$, the scoring module 107 calculates the following web support scores $W_m$ for the geocoding results $G_1$, $G_2$, and $G_3$:

$$W_1 = 0.0;$$

$$W_2 = 0.15; \text{ and}$$

$$W_3 = 0.0.$$

In this example, the scoring module 107 adds the web support score $W_m$ to the geocoding score $S_m$ for each geocoding result $G_m$ resulting in the in the updated geocoding scores $US_m$:

$$US_1 = S_1 + W_1 = 0.3 + 0 = 0.3;$$

$$US_2 = S_2 + W_2 = 0.25 + 0.15 = 0.4; \text{ and}$$

$$US_3 = S_3 + W_3 = 0.2 + 0 = 0.2.$$

In one embodiment, the scoring module 107 re-ranks the geocoding results $G_m$ and selects the geocoding result with the highest updated geocoding scores $US_m$ to provide to the client 115 of the user. In the example illustrated with respect to FIG. 2, the scoring module 107 selects online map 200B describing the geographic location of "Union Square Park, New York, N.Y." since geocoding result $G_2$ has the highest undated geocoding score $US_2$ which is equal to 0.4. This causes the map module 109 to provide online map 200*b* to the client 115 to fulfill the search query for "Union Square." If the updated geocoding scores $US_m$ were not calculated, the geocoding result $G_1$ associated with San Francisco, Calif. (e.g., online map 200A) would have been provided to the user in response to the search query since geocoding result $G_1$ has the highest non-updated geocoding score $S_1$ which is equal to 0.3. Note that in one embodiment, the output of the scoring module 107 may be exposed via an application programming interface (API) to outside services to allow these services to provide information related to the geocoding results other than online maps such as business listings associated with the search query.

Process for Providing a Geocoding Result

Figure 3:
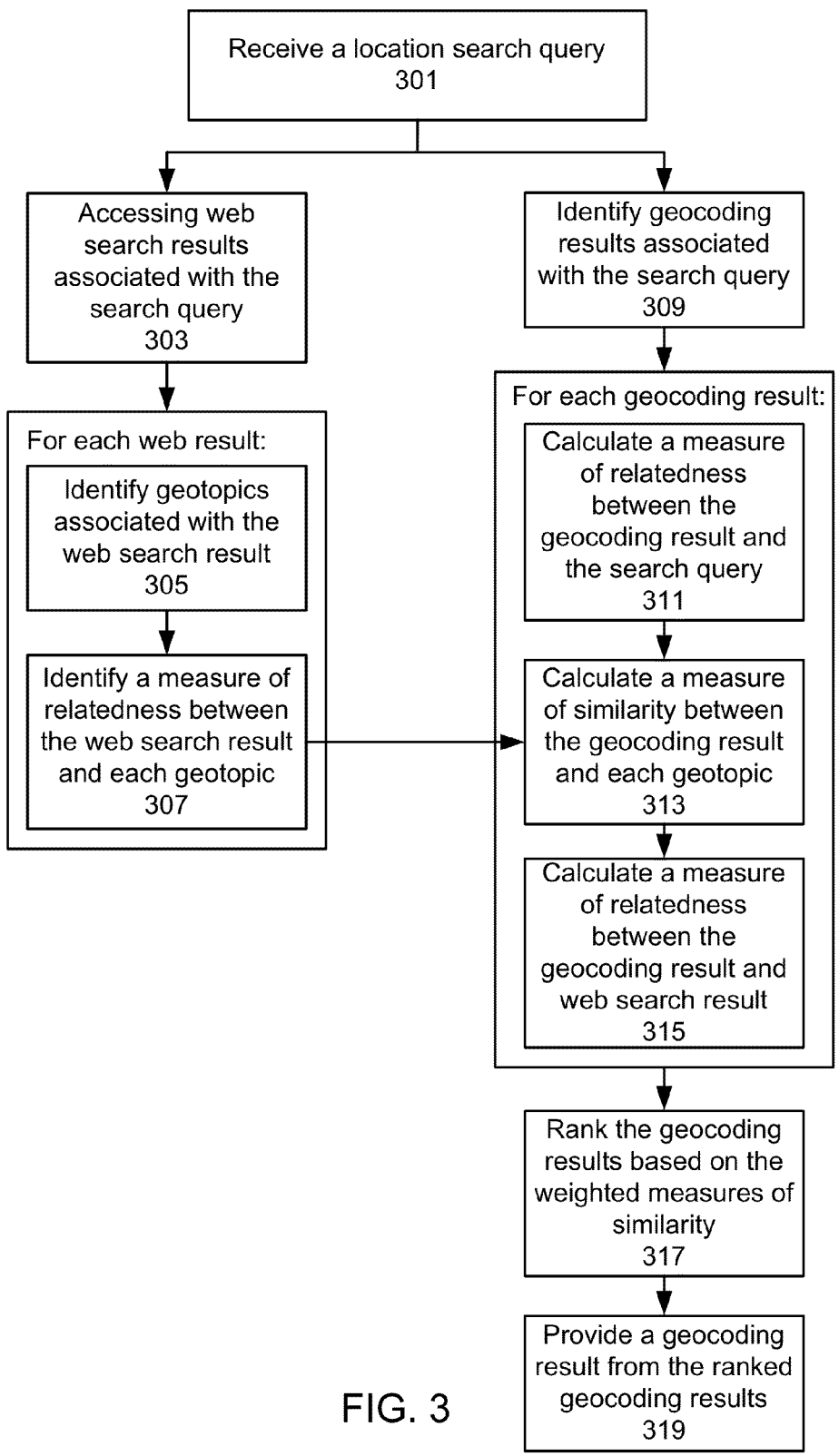
FIG. 3 illustrates a method for providing a geocoding result according to one embodiment.

Referring now to FIG. 3, there is shown one embodiment of a computer-implemented method performed by the geographical information system 100 for providing a geocoding result to fulfill a location search query received from a client 115. Note that in alternative embodiments, other steps may be performed other than those shown in FIG. 3.

In one embodiment, the geographical information system 100 receives 301 a location search query. The location search query may include one or more keywords that represent a name of a map feature or an address associated with a map feature. The geographical information system 100 accesses 303 web search results associated with the location search query. For each web result, the geographical information system identifies 305 geotopics associated with the web result and identifies 307 a measure of relatedness (i.e., a geotopic score $gs_k$) between the web result and each identified geotopic otherwise known as a geotopic score $gs_k$.

The geographical information system 100 also identifies 309 geocoding results associated with the location search query. The geocoding results represent geographic locations which match on some level the keywords included in the search query. For each geocoding result, the geographical information system 100 calculates 311 a measure of relatedness between the geocoding result and the search query (e.g., a geocoding score $S_m$). The geographical information system 100 also calculates 313 a measure of similarity between the geocoding result and each geotopic that is associated with the web search results (e.g., a similarity score S(m,k)). The geographical information system 100 then calculates 315 a weight for the measure of relatedness between the geocoding results and the web search results (e.g., a web support score $W_m$).

The geographical information system 100 then ranks 317 the geocoding results based on the weighted measures of similarity. The geographical information system 100 then determines a geocoding result from the ranked geocoding results, and provides 319 to the client 115 a map including the location identified by the geocoding results. In one embodiment, the geographical information system 100 may also provide the web search results with the online map. In one embodiment, the geographical information system 100 provides to the client 115 a map including the location identified by the geocoding result with the highest updated geocoding score $US_m$ as described above.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

We claim:

1. A computer-implemented method for providing an online map, the method comprising:
    receiving a search query from a client;
    identifying a plurality of geocoding results based on the search query;
    accessing a set of web search results based on the search query, wherein the web search results are associated with a plurality of geotopics;
    ranking the plurality of geocoding results based on a measure of relatedness between each geocoding result and the search query and a measure of relatedness between each geocoding result and the plurality of geotopics associated with the web search results; and
    providing, to the client, an online map displaying a geographical location corresponding to at least one of the geocoding results based on the ranked plurality of geocoding results.

2. The computer-implemented method of claim 1, wherein the search query comprises a partial address of a geographical location.

3. The computer-implemented method of claim 1, wherein the search query comprises a name of a geographical location.

4. The computer-implemented method of claim 1, wherein a geotopic associated with a web search result is identified from content of the web result.

5. The computer-implemented method of claim 1, wherein each geotopic associated with a web search result is associated with a measure of relatedness between the geotopic and the web search result.

6. The computer-implemented method of claim 5, wherein the measure of relatedness between the geotopic and the web search result is based on at least one of a location in which the geotopic appears in a document associated with the web search result, a number of other geotopics from the plurality of geotopics that are associated with a geographic location represented by the geotopic, or a relatedness of the geotopic to other geotopics in the plurality of geotopics.

7. The computer-implemented method of claim 1, further comprising:
calculating the measure of relatedness between each geocoding result and the search query, wherein the measure of relatedness for each geocoding result is based on at least one of a number of keywords included in the search query, a measure of the completeness of an address included in the search query, or a prominence of the geographic location associated with the geocoding result.

8. The computer-implemented method of claim 1, further comprising:
calculating the measure of relatedness between each geocoding result and the plurality of geotopics, wherein the measure of relatedness between a geocoding result and a geotopic is based on at least one of a match between a name of a geographical location associated with the geocoding result and a name of a geographical location associated with the geotopic, a distance between the geographical location associated with the geocoding result and
the geographic location associated with the geotopic, or a number of terms in the name of the geographic location associated with the geocoding result and the name of the geographical location associated with the geotopic.

9. The computer-implemented method of claim 1, wherein the measure of relatedness between each geocoding result and the plurality of geotopics is based at least in part on the measure of relatedness between each geocoding result and one of the plurality of geotopics and the measure of relatedness between the one of the plurality of geotopics and the web search results associated with the one of the plurality of geotopics.

10. The computer-implemented method of claim 1, wherein providing the online map of the geographic location comprises:
identifying a highest ranking geocoding result from the ranked plurality of geocoding results; and
providing the online map associated with the highest ranking geocoding result.

11. A computer program product comprising a non-transitory computer-readable storage medium containing executable computer program code for providing an online map, the code when executed are for:
receiving a search query from a client;
identifying a plurality of geocoding results based on the search query;
accessing a set of web search results based on the search query, wherein the web search results are associated with a plurality of geotopics;
ranking the plurality of geocoding results based on a measure of relatedness between each geocoding result and the search query and a measure of relatedness between each geocoding result and the plurality of geotopics associated with the web search results; and
providing, to the client, an online map displaying a geographical location corresponding to at least one of the geocoding results based on the ranked plurality of geocoding results.

12. The computer program product of claim 11, wherein the search query comprises a partial address of a geographical location.

13. The computer program product of claim 11, wherein a geotopics associated with a web search result is identified from content of the web result.

14. The computer program product of claim 11, wherein each geotopic associated with a web search result is associated with a measure of relatedness between the geotopic and the web search result.

15. The computer program product of claim 14, wherein the measure of relatedness between the geotopic and the web search result is based on at least one of a location in which the geotopic appears in a document associated with the web search result, a number of other geotopics from the plurality of geotopics that are associated with a geographic location represented by the geotopic, or a relatedness of the geotopic to other geotopics in the plurality of geotopics.

16. The computer program product of claim 11, where the code when executed is further for:
calculating the measure of relatedness between each geocoding result and the search query, wherein the measure of relatedness for each geocoding result is based on at least one of a number of keywords included in the search query, a measure of the completeness of an address included in the search query, or a prominence of the geographic location associated with the geocoding result.

17. The computer program product of claim 11, where the code when executed is further for:
calculating the measure of relatedness between each geocoding result and the plurality of geotopics, wherein the measure of relatedness between a geocoding result and a geotopic is based on at least one of a match between a name of a geographical location associated with the geocoding result and a name of a geographical location associated with the geotopic, a distance between the geographical location associated with the geocoding result and the geographic location associated with the geotopic, or a number of terms in the name of the geographic location associated with the geocoding result and the name of the geographical location associated with the geotopic.

18. The computer program product of claim 11, wherein the measure of relatedness between each geocoding result and the plurality of geotopics is based at least in part on the measure of relatedness between each geocoding result and one of the plurality of geotopics and the measure of relatedness between the one of the plurality of geotopics and the web search results associated with the one of the plurality of geotopics.

19. A computer system for providing an online map, the system comprising:
at least one server computer comprising a computer processor, the computer processor configured to execute instructions stored on a computer-readable storage medium, the instructions when executed by the computer processor cause the processor to:

receive a search query from a client;

identify a plurality of geocoding results based on the search query;

access a set of web search results based on the search query, wherein the web search results are associated with a plurality of geotopics;

rank the plurality of geocoding results based on a measure of relatedness between each geocoding result and the search query and a measure of relatedness between each geocoding result and the plurality of geotopics associated with the web search results; and provide, to the client, an online map displaying a geographical location corresponding to at least one of the geocoding results based on the ranked plurality of geocoding results.

20. The computer system of claim 19, wherein each geotopic associated with a web search result is associated with a measure of relatedness between the geotopic and the web search result.

21. The computer system of claim 20, wherein the measure of relatedness between the geotopic and the web search result is based on at least one of a location in which the geotopic appears in a document associated with the web search result, a number of other geotopics from the plurality of geotopics that are associated with a geographic location represented by the geotopic, or a relatedness of the geotopic to other geotopics in the plurality of geotopics.

22. The computer system of claim 19, wherein the instructions when executed by the computer processor further cause the processor to:

calculate the measure of relatedness between each geocoding result and the search query, wherein the measure of relatedness for each geocoding result is based on at least one of a number of keywords included in the search query, a measure of the completeness of an address included in the search query, or a prominence of the geographic location associated with the geocoding result.

23. The computer system of claim 19, wherein the instructions when executed by the computer processor further cause the processor to:

calculate the measure of relatedness between each geocoding result and the plurality of geotopics, wherein the measure of relatedness between a geocoding result and a geotopic is based on at least one of a match between a name of a geographical location associated with the geocoding result and a name of a geographical location associated with the geotopic, a distance between the geographical location associated with the geocoding result and the geographic location associated with the geotopic, or a number of terms in the name of the geographic location associated with the geocoding result and the name of the geographical location associated with the geotopic.

24. The computer system of claim 19, wherein the measure of relatedness between each geocoding result and the plurality of geotopics is based at least in part on the measure of relatedness between each geocoding result and one of the plurality of geotopics and the measure of relatedness between the one of the plurality of geotopics and the web search results associated with the one of the plurality of geotopics.

\* \* \* \* \*